United States Patent [19]

Kuriya

[11] 4,152,768
[45] May 1, 1979

[54] ELECTRONIC APPARATUS WITH CALENDAR

[75] Inventor: Katsumi Kuriya, Shiojiri, Japan

[73] Assignee: Shinshu Seiki Kabushiki Kaisha, Suwa, Japan

[21] Appl. No.: 821,873

[22] Filed: Aug. 4, 1977

[30] Foreign Application Priority Data

Aug. 4, 1976 [JP] Japan .................................. 51-92980

[51] Int. Cl.² .......................................... G06F 19/24
[52] U.S. Cl. ..................................... 364/705; 58/4 A
[58] Field of Search .................... 364/705; 58/4 A, 58

[56] References Cited

U.S. PATENT DOCUMENTS

| Re. 29,250 | 6/1977 | Tanaka | 58/58 |
| 3,464,200 | 9/1969 | Merrick | 58/58 |
| 3,797,222 | 3/1974 | Kato | 58/4 A |
| 3,810,322 | 5/1974 | Ritchie | 58/4 A X |
| 3,813,533 | 5/1974 | Cone et al. | 364/705 |
| 3,922,842 | 12/1975 | Fujita | 58/4 A |
| 4,020,627 | 5/1977 | Yoshida | 58/4 A X |

Primary Examiner—David H. Malzahn
Attorney, Agent, or Firm—Blum, Moscovitz, Friedman & Kaplan

[57] ABSTRACT

An electronic apparatus with calendar is provided incorporating calculation circuitry and a display portion for displaying the up to thirty-one dates in a month and a day of the week so that a user is provided with a visual indication representative of the day of the week and the date of the month. The date of the month may be directly indicated or indicated indirectly by the day of the week indication.

9 Claims, 6 Drawing Figures

ELECTRONIC APPARATUS WITH CALENDAR

BACKGROUND OF THE INVENTION

This invention relates generally to electronic apparatus provided with a perpetual calendar. Among such electronic apparatus are digital electronic wrist watches and electronic calculators incorporating timepiece functions. These products can display the present day of the week, the present date and the present month but cannot provide a day of the week and date display by way of a calendar which permits viewing at a glance the days of the week of all of the days of a given month, due to the difficulties of effecting such a display, the limitations of display space on the product, the cost of a suitable control circuit and the ratio of the necessity for such a product and the cost thereof.

However, it is desirable to provide an electronic apparatus with such a calendar capability and by the arrangement in accordance with the invention, the foregoing difficulties are overcome and an economical and efficient calendar display is provided.

SUMMARY OF THE INVENTION

Generally speaking, in accordance with the invention, an electronic apparatus with calendar is provided including calendar calculation circuit means, display means for permitting display of a day of the week and all of the thirty-one dates of a month, and means for visually identifying a day of the week and an associated date of the month on said display means in response to the signals generated by said calendar calculation means. The display means may include an active display element and all of the days of the week and the dates of the month may be presented in separate fields on the active display element, the field associated with the selected day of the week and a selected date of the week being selectively rendered visually distinguishable in response to said calendar calculation means. In the alternative, the display means may include an active display element and a passive display element, said dates of the month being oriented in groups by day of the week in calendar fashion on said passive display element, said active display element including means for providing said day of the week indication in a manner to identify each of the groups of dates of the month with the day of the week for a designated month.

Means may be provided for applying a selected month to said calendar calculation means for designation of at least the corresponding day of the week.

Accordingly, it is an object of the present invention to provide an electronic apparatus incorporating a timekeeping device capable of providing a calendar showing the seven days of the week of a designated month.

Another object of the invention is to provide an electronic device having display sections having a five by seven display wherein the seven columns each represent the day of the week and the five columns each represent the weeks of the month and incorporating means for visually indicating the day of the week associated with a desired month.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
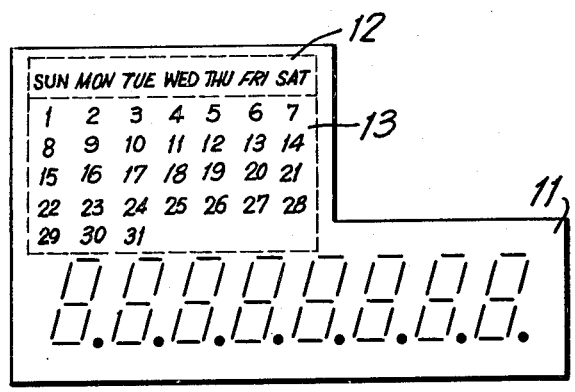
FIG. 1 is a plan view of a display arrangement of one embodiment of a display of one embodiment of an electronic apparatus with calendar in accordance with the invention.
Figure 2:
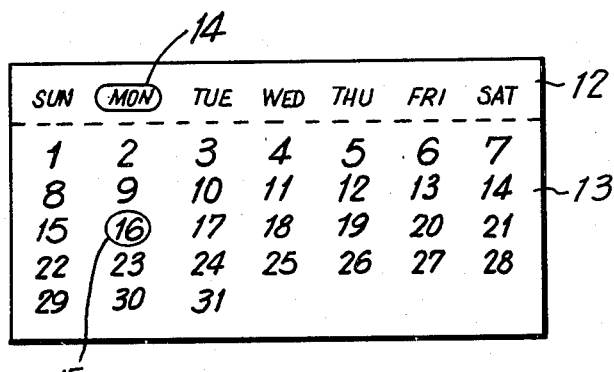
FIG. 2 is a view of the calendar portion of the display of FIG. 1 showing the designation of a day of the week and a date of the month.

Referring now to FIGS. 1 and 2, one embodiment of the display of an electronic apparatus in accordance with the invention is depicted. Display device 11 includes a first section in which eight digits of numerical data and decimal point location may be displayed. The respective numbers are displayed by way of a conventional seven-bar display. In addition to the conventional seven-bar numerical display, display 11 further includes a section 12 in which the seven days of the week are identified and a section 13 in which the dates of a month from the first to the thrity-first day are shown. While display 11 of FIG. 1 is depicted with the three sections formed as a unitary display device, separate display sections may be utilized for the three sections, numerical output, days of the week and dates of the month. Display 11 is of the active type such as a liquid crystal display, plasma display or light emitting diode display, wherein the selected display is visually indicated by lighting selected fields of the display or otherwise rendering the selected fields of the display visually distinguishable.

Referring more particularly to FIG. 2, the days of the week and dates of the month sections of the display 11 are more particularly shown. In the example of FIG. 2, indicating mark 14 in the region of the term "MON" indicates the designation of Monday as the day of the week and indication 15 in the region or field of the numeral "16" indicates the designation of 16 as the current day of the week. While in the example of FIG. 2, the 16th of the month and Monday happen to fall in the same column, this is merely by way of coincidence, and any date of the month may be designated independent of the day of the week. Where a liquid crystal or plasma display is used as the active display, electrodes representing all of the days of the week and dates of the month may be printed on the glass plate thereof so that all of the days of the week and dates of the month are always visible, the indicating marks such as marks 14 and 15 being selectively rendered visible to identify the selected day and date. In the alternative, the days of the week and dates of the month may be printed on a reflector or other component of the display and may be rendered visually distinguishable by illuminating or otherwise rendering visually distinguishable the field including the designated day of the week and date of the month.

Figure 3:
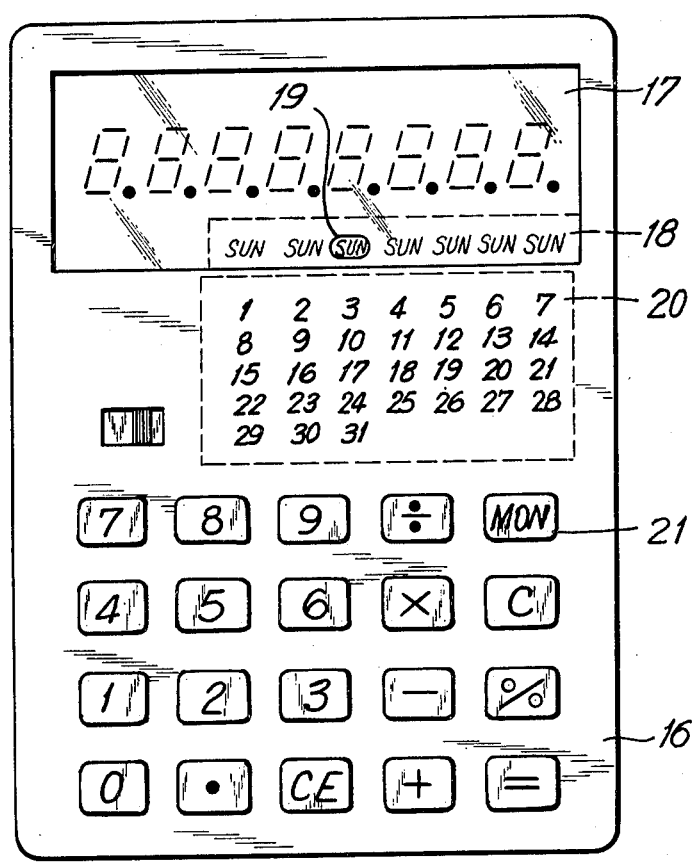
FIG. 3 is a plan view of an electronic calculator provided with a second embodiment of the calendar display in accordance with the invention.

Referring now to FIG. 3, an electronic calculator 16 incorporating a second embodiment of the display in accordance with the invention is depicted. In the embodiment of FIG. 3, the active display 17 includes a first section containing an eight digit seven-bar numerical display and a section 18 representative of the days of the week. In the case of section 18, while seven indicia are provided, one for each day of the week, they are all identical but define seven columns. Fixed to the surface of calculator 16 is a passive display region 20 consisting of the dates of the month (1 through 31) arranged in seven vertical columns, thereby defining five horizontal columns representing the five weeks of a month. This calendar-type orientation of the dates of the month conforms with the calendar, wherein the first, eighth, fifteenth, twenty-second and twenty-ninth day of a month always fall on the same day of the week, as do the fourth, eleventh, eighteenth and twenty-fifth. Each of the seven columns are aligned with one of the seven days of the week indicia of section 18 of active display 17. In this manner, by selectively designating one of the days of the week of section 18 of active display 17, as by illuminating an indicating mark 19, one of the columns of the calendar array 20 of the dates of the month is designated as Sunday. In the example of FIG. 3, the third column including the third, tenth, seventeenth, twenty-fourth and thirty-first of the month are designated as Sunday. In this manner, the user can determine at a glance the day of the week associated with each day of the current or otherwise designated month. By this manner, a practical, yet inexpensive calendar is provided. If desired, an additional date display can be provided in active display 17 so that the current date can be selectively displayed but the user is provided with the added advantage of an accurate current calendar, the day of the week in portion 18 of active display 17 automatically changing from month to month. Passive calendar array 20 can take the form of imprinting directly on the case of calculator 16, or on a sticker or other means affixed to such case.

In addition to the conventional calculator keys, calculator 16 is provided with a key 21 marked "MON" which is used to automatically designate the proper day of the week setting in portion 18 of active display 17 corresponding to a selected month. Thus, the month can be designated numerically using the number keys of the calculator and when so set, and key 21 is depressed, the calendar calculating circuitry of the calculator determines the appropriate orientation of Sunday relative to the calendar display 20 for the selected month and an indicia 19 marks the selected orientation for Sunday in an automatic manner. The passive display 20 may be formed as part of active display 17, with or without the indicia of FIg. 2. If provided with the indicia of FIG. 2, then the display would be an active display. As a compromise between a full active display and the passive display of FIg. 3, means can be provided for selectively illuminating or not illuminating the twenty-ninth, thirtieth and thirty-first dates indicia so as to provide more accurate calendar representation, the calendar calculating circuitry automatically selectively illuminating or not illuminating the twenty-ninth, thirtieth and thirty-first indicia, depending on the month designated.

Figure 4:
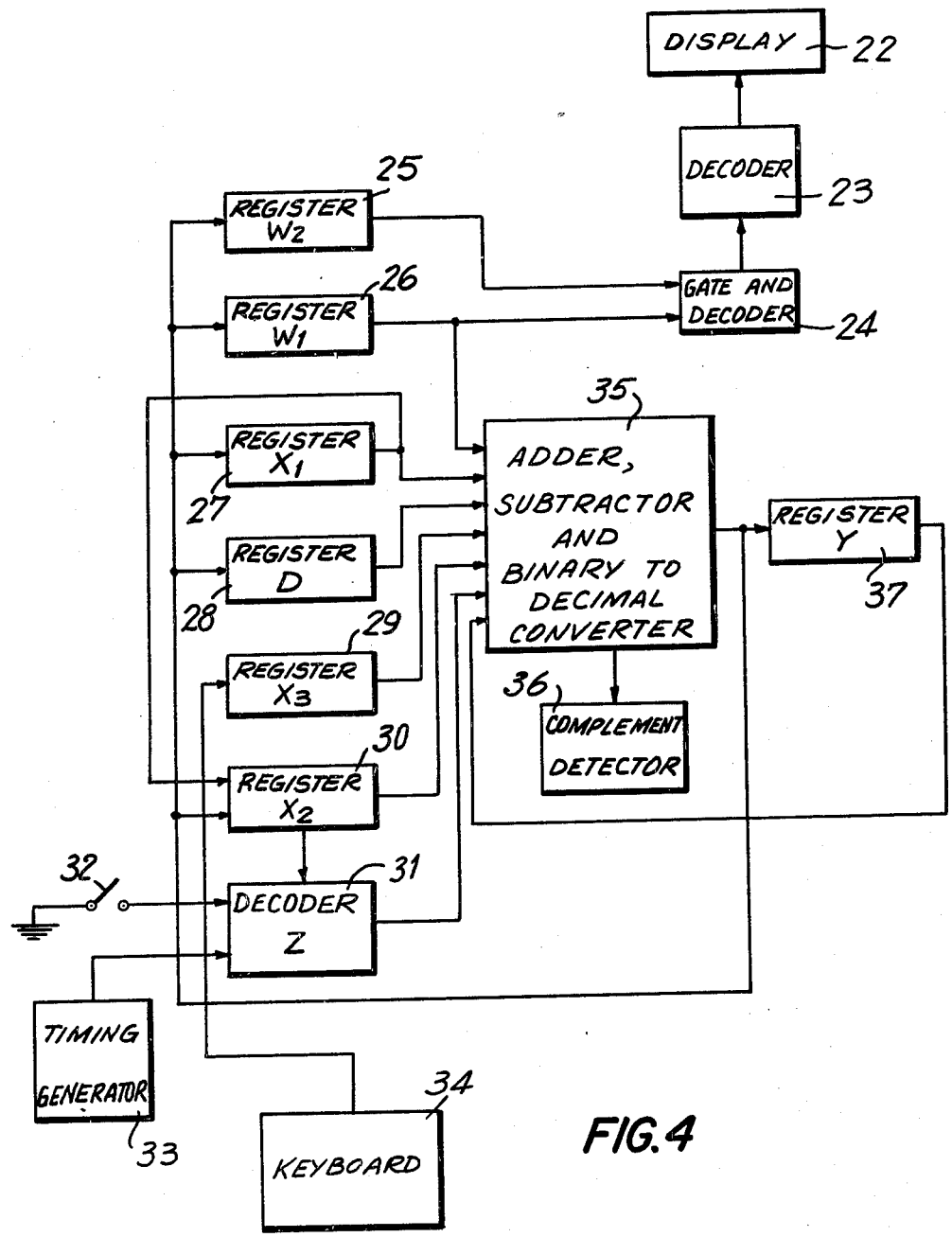
FIG. 4 is a block diagram showing the calendar calculating circuitry in accordance with the invention.

Turning now to FIG. 4, one embodiment of a calendar calculating circuit is depicted by way of block diagram. Specifically, the day of the week display 22 is driven by a display decoder 23, which is in turn driven by a gate and calendar decoder 24. The gate portion of gate and calendar decoder 24 selects between the contents of $W_2$ register 25 which records the day of the week of the month designated by input key 21 and a $W_1$ register 26 which records the day of the week of the present month. The circuit of FIG. 4 includes five further registers, namely $X_1$ register 27 which records a number representative of the present month (January, February, etc.), D register 28 which records the present date of the month, $X_3$ register 29 which records the month designated by means of key 21, $X_2$ register 30 which is a register for recording a number representative of either the present or a designated month during calculation, for the purpose of setting in Z decoder 31 a number equal to the total number of days in the designated month (28, 29, 30 or 31), and Y register 37 which is used for calculations. The input to $X_3$ register 29 is from keyboard 34 which could correspond to the keyboard of calculator 16 of FIG. 3 and include key 21. The output of each of registers 26, 27, 28, 29, 30 and 37 and decoder 31 is applied to adder, subtractor and binary to decimal converter 35 which performs calculations as will be more particularly described below for the purpose of automatically changing the day of the week indication so as to be appropriate for the next month, and further, for the purpose of changing the day of the week indication to that of the month designated by means of key 21 of keyboard 34. Also used in such calculations is a complement detector 36 coupled to said adder, subtractor and binary to decimal converter 35 and the above-described registers. Said adder, subtractor and binary to decimal converter may apply inputs to $W_2$ register 25, $W_1$ register 26, $X_1$ register 27, D register 28 and $X_2$ register 30. Also coupled to Z decoder 31 is a switch 32 for the purpose of providing a selective indication of leap year, so that the output of Z decoder 31 may be set at either "28" or "29", and timing generator 33.

Figure 5:
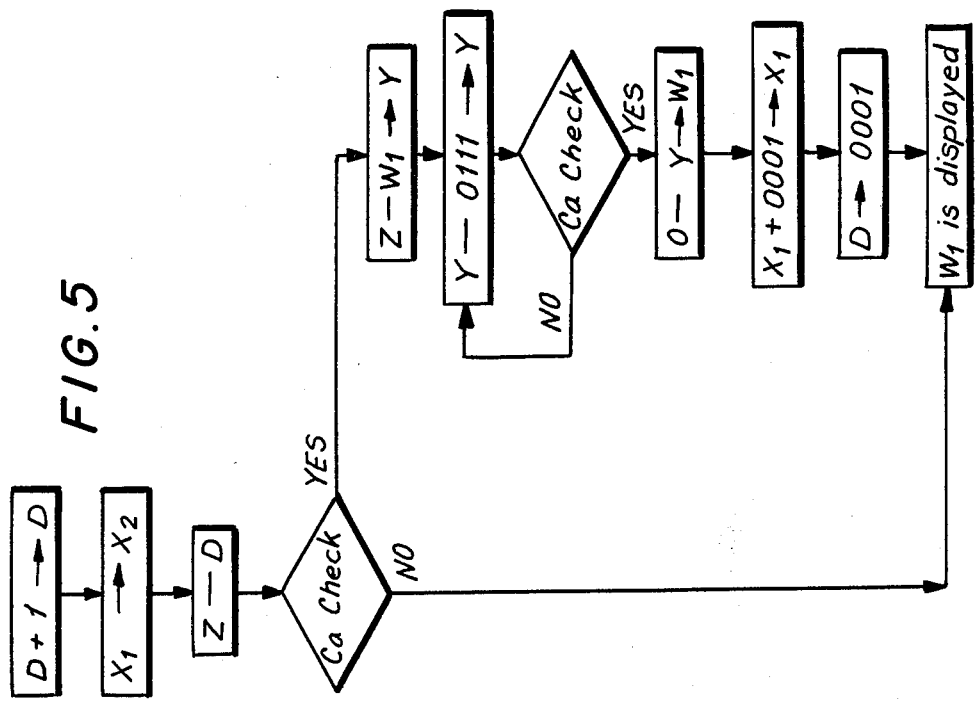
FIG. 5 is a calculation flow chart of the calendar calculation circuit of FIG. 4 in resetting $W_1$ register 26 at the end of the present month.

FIG. 5 shows the calculation flowchart of the calendar calculation circuit of FIG. 4 in resetting $W_1$ register 26 at the end of the present month.

As indicated by the flow chart of FIG. 5, when the contents of D register 28 exceeds the number of days of the present month, as determined by Z decoder 31, then the number representative of the current month as contained in $X_1$ register 27 is increased by one and the D register 28 is reset to one. Further, and most important, the appropriate day of the week setting as reflected by $W_1$ register 26 is reset to a new position automatically determined by a count down by seven procedure as illustrated by FIG. 5.

Figure 6:
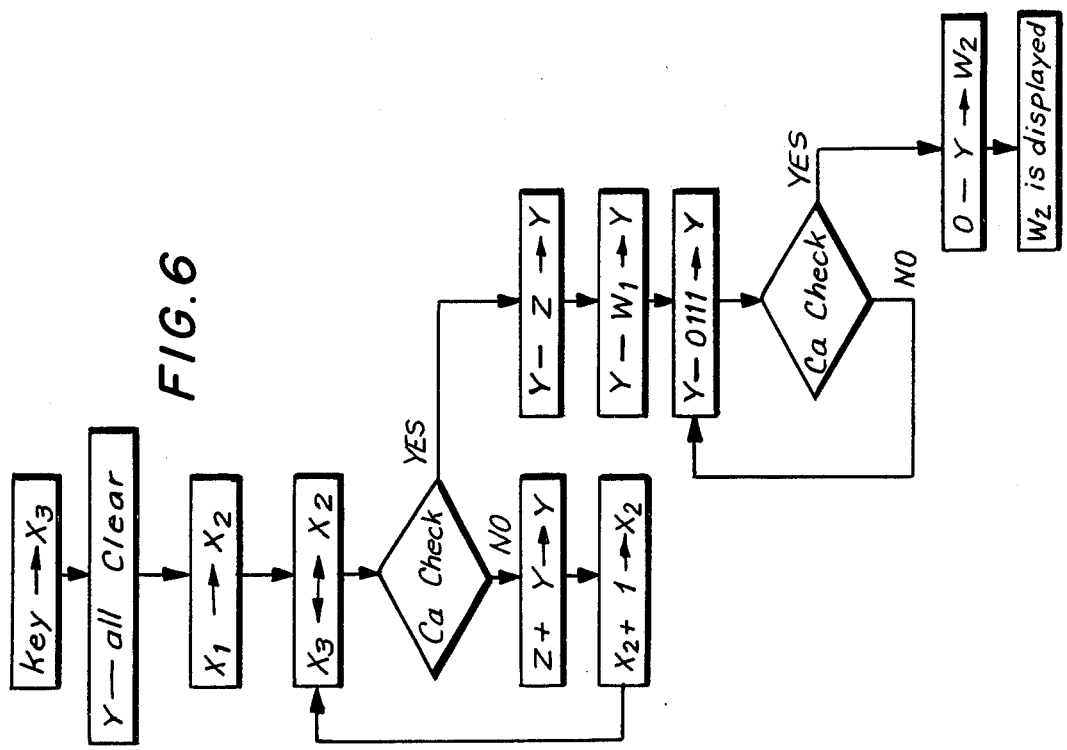
FIG. 6 is a calculation flow chart of the calendar calculation circuit of FIg. 4 for performing the function of changing the calendar so that the day of the week indication reflects the appropriate position for a desired month.

Referring now to FIG. 6, the calculation flowchart of the calendar calculation circuit of FIG. 4 is depicted for performing the function of changing the calendar so that the day of the week indication reflects the approporiate position for a desired month.

By the foregoing sequence of events, the number stored in the $X_3$ register 29 representative of the month desired and the number stored in the $X_2$ register 30 representative initially of the present month and thereafter representative of the present month plus one for each cycle, are compared until the contents of the Y register represents the number of days between the two months, which value is eventually reduced by the contents of the $W_1$ register, 26 and by a series of sevens to produce a new setting for the $W_2$ register 25 representative of the proper position of the day of the week of the designated month. By this arrangement, the calendar of the present month as represented by the position of the day of the week still memorialized in $W_1$ register 26. By suitable controls which can be actuated by selective combinations of the keys of calculator 16 in a conventional manner, the user may select which of the present and designated month is to be displayed on the calendar. Further, such conventional controls can be provided to transfer the contents of $W_2$ register 25 into $W_1$ register 26 to make the designated month the present month. Similar conventional controls can be provided for resetting register D to change the current day of the month.

By the foregoing arrangements, an electronic apparatus such as an electronic calculator incorporating a timepiece function or an electronic wristwatch may be provided with a calendar display at a low cost and in a small space not heretofore available.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic apparatus with calendar comprising calendar calculation circuit means, display means for permitting display of a day of the week and all of the thirty-one dates of a month, and means for visually identifying a day of the week and an associated date of a designated month on said display means in response to the signals generated by said calendar calculation circuit means, said display means being adapted to define said dates of the month in calendar-like fashion by indicia each representative of one of the numerals from "1" through "31" aligned in seven side-by-side columns with the numerals in each column defining at least five rows and extending in numerical order between adjacent columns and rows, said display means including an active display having seven identical days of the week indicia each respectively aligned with one of said columns of said dates of the month and each associated with a single day of the week, said visual identifying means rendering one of said seven day of the week indicia visually distinguishable whereby all of the days of the month are associated with a day of the week of a selected month.

2. An electronic apparatus with calendar as recited in claim 1, wherein said display means includes a passive display element wherein said days of the week indicia are fixed.

3. An electronic apparatus with calendar comprising calendar calculation circuit means, display means for permitting display of a day of the week and all of the thirty-one dates of a month, and means for visually identifying a day of the week and an associated date of a designated month on said display means in response to the signals generated by said calendar calculation circuit means, said calendar calculation circuit means including a first register for storing a number representative of the displayed day of the week, a second register storing a number representative of the present month, a third register storing a number representative of the present day, decoder means for providing the number of days associated with each of the twelve months of the year, and calculation means for adding one to the count of said third register each day and thereafter comparing the count of the third register with the number of days associated with the month indicated by the second register as determined by said decoder means, and if the count of said third register is greater, then subtracting from the number of days associated with the month identified in the second register an amount equal to first the number in the first register and thereafter successive counts of seven until a negative number is obtained, and thereafter resetting said first register to the absolute value of said negative number, resetting said third register to a count of one and adding a count of one to the count of said second register, whereby said visual indicating means visually identifies the day of the week indicia associated with the current month in response to the contents of the first register.

4. An electronic apparatus with calendar as recited in claim 3, including a fifth register for receiving a number representative of a month to which it is desired to set the calendar, said calculation means comparing the number in said second and fifth registers and repetitively adding the number of days corresponding to the month designated by the second register as determined by the decoder means to the number of days of each successive month as determined by successively adding one to the number in said second register and determining the number of days associated therewith by said decoder means until the number of said second and fifth registers are identical to produce a month-difference sum, and thereafter subtracting from said month-difference sum the number of days associated with the first setting of said second register, the number set in said second register and thereafter successive counts of seven until the month-difference sum is reduced to a negative number and thereafter applying said negative number to said first register as representative of the day of the week associated with the newly-designated month.

5. The electronic apparatus with calendar as claimed in claim 3, wherein said display includes an active display element including a plurality of fields, each of the days of the week and the dates of the month being represented by indicia in one of the fields, said visual identifying means and display means being adapted so that a selected date of a designated month and the associated day of the week are both rendered visually distinguishable in response to said calendar calculation means.

6. An electronic apparatus with calendar as recited in claim 3, wherein said first register includes two separate registers, one representative of the day of the week of the month designated in the second register and receiving the day of the week number calculated as a result of the automatic succession to the next month, the other register being representative of the day of the week of a designated month and receiving the day of the week calculated in response to the designation of a month in the fifth register.

7. An electronic apparatus with calendar as recited in claim 5, wherein said thirty-one indicia representative of the dates of the month are the numerals "1" through "31", said numeral indicia being arrayed in a calendar-like array including seven vertical columns and five horizontal columns.

8. An electronic apparatus with calendar as recited in claim 3, wherein said dates of the month are defined in calendar-like fashion by indicia each representative of one of the numerals from "1" through "31" aligned in seven side-by-side columns with the numerals in each column defining at least five rows and extending in numerical order between adjacent columns and rows, said display means including an active display having seven indicia each respectively aligned with one of said columns of said dates of the month, said visual identifying means rendering one of said seven day of the week indicia visually distinguishable whereby all of the days of the month are associated with a day of the week of a selected month.

9. An electronic apparatus with calendar as recited in claim 8, wherein said seven indicia of the days of the week are all identical and associated with a single day of the week.

* * * * *